(12) United States Patent
Lu (10) Patent No.: US 6,245,233 B1
(45) Date of Patent: Jun. 12, 2001

(54) WATER FILTERING APPARATUS WITH WATER FLOW SWITCH VALVE DEVICE

(76) Inventor: Chih Wen Lu, P.O. Box 82-144, Taipei (TW)

( * ) Notice: Subject to any disclaimer, the term of this patent is extended or adjusted under 35 U.S.C. 154(b) by 0 days.

(21) Appl. No.: 08/978,780

(22) Filed: Nov. 26, 1997

(51) Int. Cl.⁷ .................................................. B01D 24/46
(52) U.S. Cl. ............................................ 210/278; 210/425
(58) Field of Search .................... 137/625.46, 625.47; 210/278, 425

(56) References Cited

U.S. PATENT DOCUMENTS

| | | | | |
|---|---|---|---|---|
| 576,378 | * | 2/1897 | Robinson | 137/625.47 |
| 2,897,968 | * | 8/1959 | Nergaard | 210/278 |
| 3,513,981 | * | 5/1970 | Mendelow | 210/425 |
| 4,674,538 | * | 6/1987 | Yes | 137/625.46 |
| 4,968,334 | * | 11/1990 | Hilton | 137/625.47 |

\* cited by examiner

Primary Examiner—Ivars Cintins
(74) Attorney, Agent, or Firm—A & J (57) ABSTRACT

A water filtering apparatus with water flow switch valve device includes a water container filled with filtering materials and a switch valve device. The switch valve device includes a valve seat, a split valve, a control rod, and a valve cover. The valve seat is provided with threaded holes for connection with water pipes. The split valve has an interior divided into two isolated and non-communicating chambers. The outer wall of the split valve enclosing the chambers is provided with spaced water holes. When the split valve is installed in the valve seat and the valve cover is assembled to the valve seat, the split valve may be used to control the direction of flow of water into the water container for purposes of filtering water or purging the water container.

5 Claims, 9 Drawing Sheets

WATER FILTERING APPARATUS WITH WATER FLOW SWITCH VALVE DEVICE

BACKGROUND OF THE INVENTION

1. Field of the Invention

The present invention relates generally to a water filtering apparatus, and more particularly to a water filtering apparatus with a switch valve for changing the direction of flow of water into a water container.

2. Description of the Prior Art

With the fast developments of industries, our sources of water have been considerably polluted. Water filtering apparatuses are therefore very popular today. With conventional water filtering apparatuses, it is necessary to replace the filter and/or filtering after a period of time or to clean the filter and/or filtering mesh regularly. One problem of replacing or cleaning the filter and/or filtering mesh is that the user may have to take the water filtering apparatus apart and then assemble it after replacement or cleaning. This is very troublesome. Besides, replacement filters and filtering meshes are quite expensive.

SUMMARY OF THE INVENTION

Accordingly, a primary object of the present invention is to provide a water filtering apparatus with a switch valve device so that the user may be able to control the direction of water flow so as to purge the water container conveniently, without the need to dismantle the water filtering apparatus for cleaning or replacement of the filter and/or filtering mesh.

Another object of the present invention is to provide a water filtering apparatus with a switch valve device in which the switching position of the switch valve can be easily and correctly identified.

A further object of the present invention is to provide a water filtering apparatus with a switch valve device in which the filtering materials can be conveniently filled into the water container or discharged from the water container.

DETAILED DESCRIPTION OF THE PREFERRED EMBODIMENT

Figure 1:
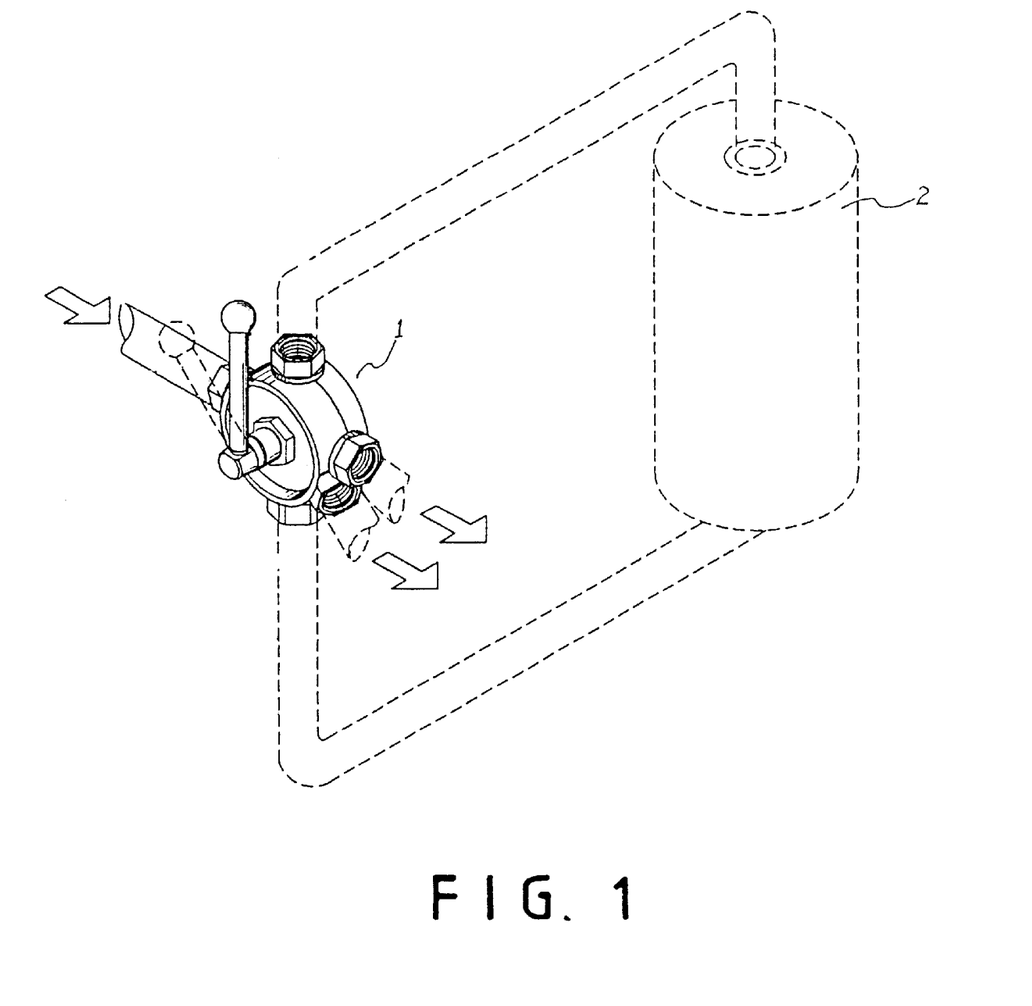
FIG. 1 is a perspective assembled view of the present invention.

With reference to FIG. 1, the water filtering apparatus with a switch valve device for switching water flow according to the present invention comprises a switch valve device 1 adapted to switch the direction of water flow and a water container 2 having an interior for filling with filtering materials. By utilizing the switch valve device 1, water may be controlled to flow into the water container 2 from an upper side of the water container and be filtered or to enter from a lower side of the water container to wash away substances or particles deposited at the bottom side of the water container, which are then discharged via a discharge port of the switch valve device 1.

Figure 2:
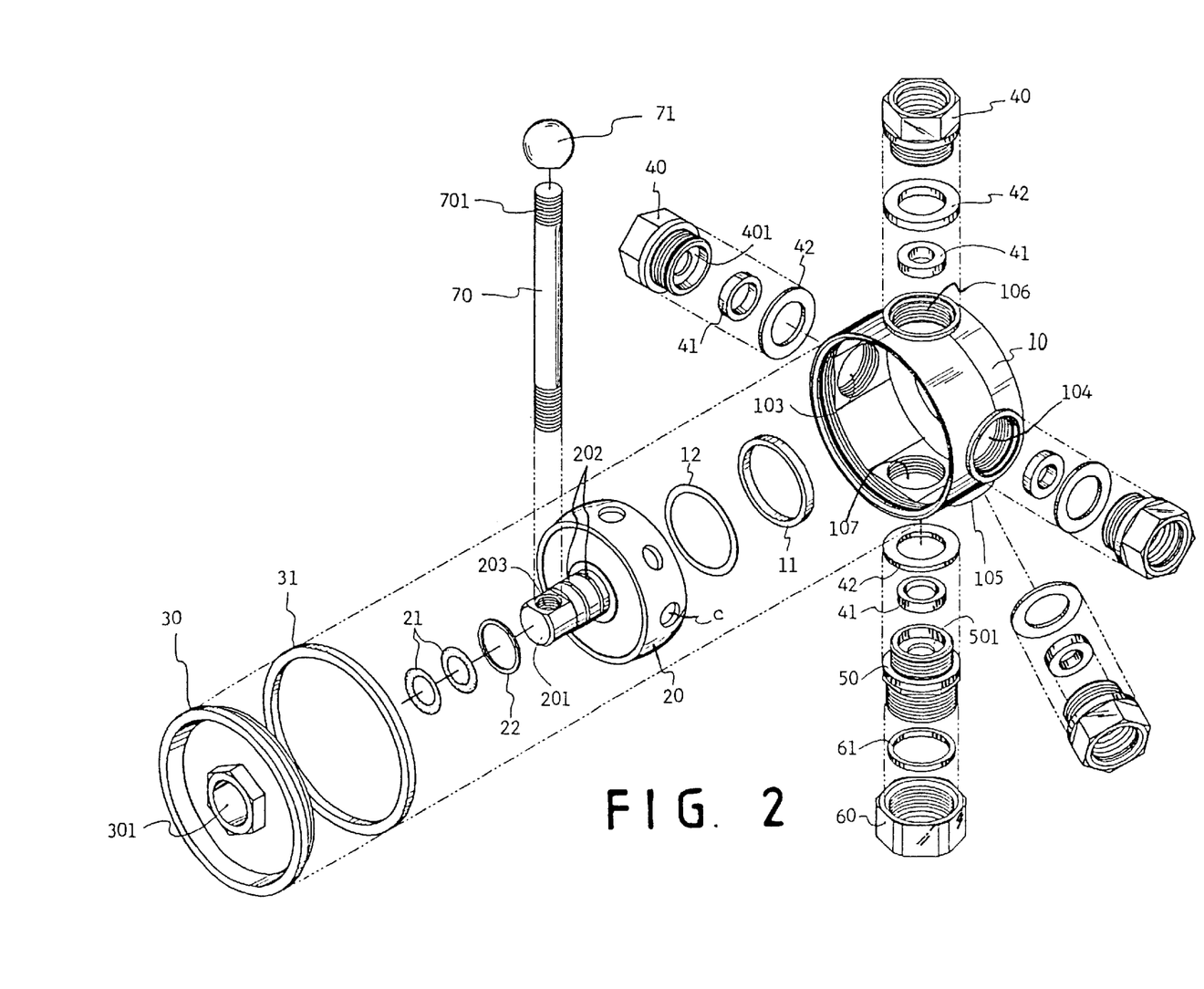
FIG. 2 is a perspective exploded view of the switch valve device of the present invention.
Figure 3:
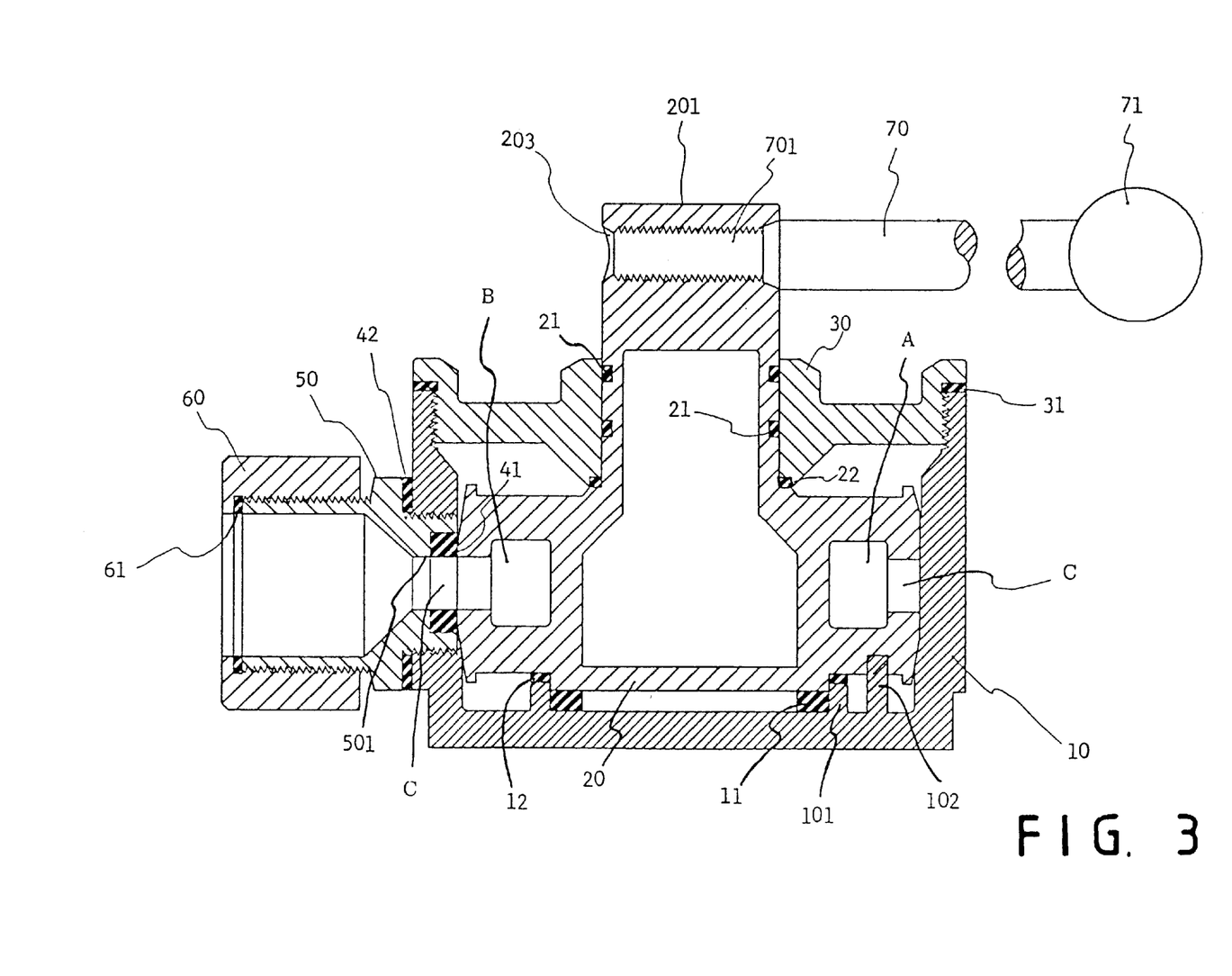
FIG. 3 is a sectional view of the switch valve device of the present invention.
Figure 4:
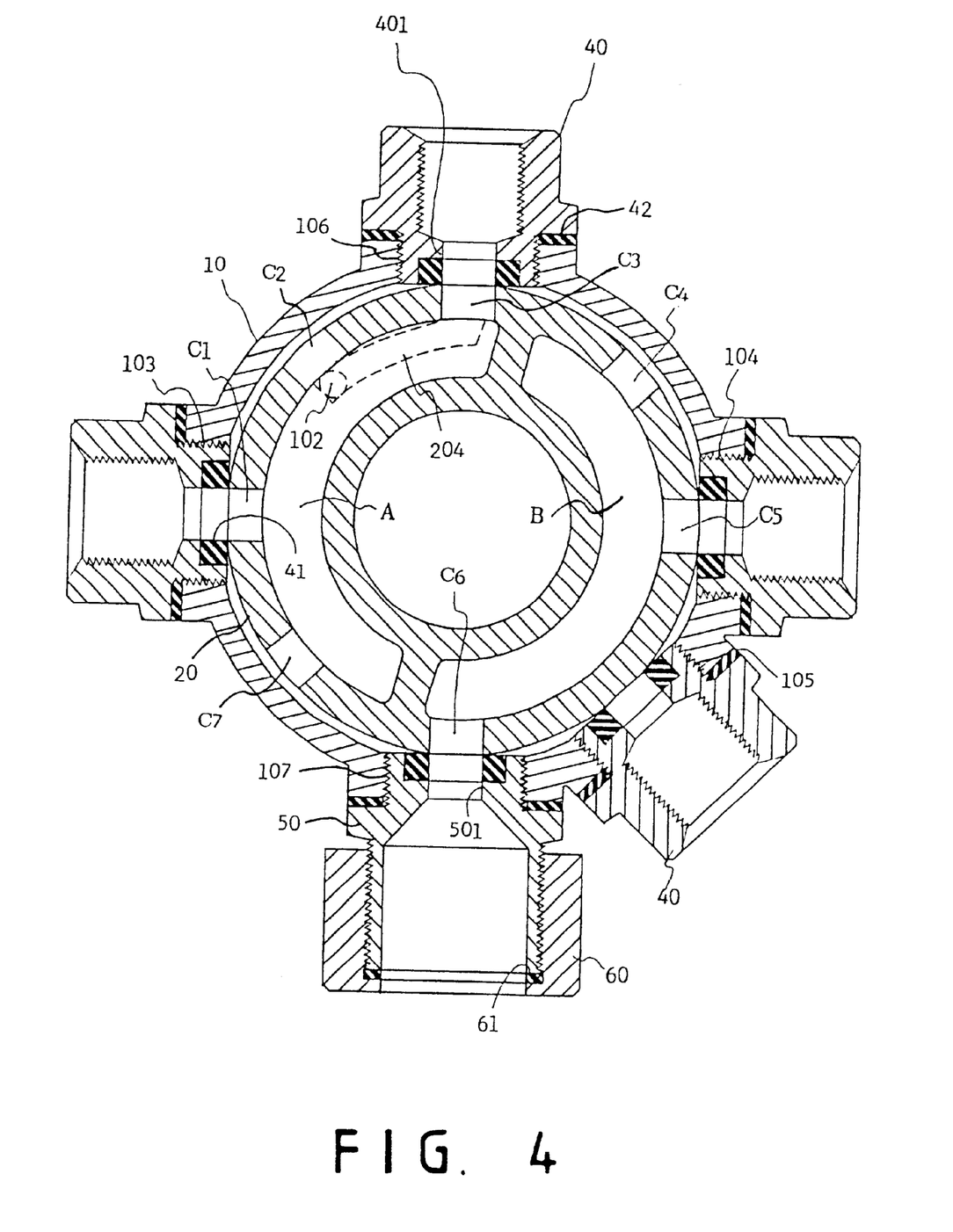
FIG. 4 is a sectional assembled view of the switch valve device of the present invention.

Referring to FIGS. 2 and 3, the switch valve device 1 essentially comprises a valve seat 10, a split valve 20, and a valve cover 30. The valve seat 10 is substantially a hollow annular casing provided with both an annular flange 101 and a post 102 at its bottom side. The annular flange 101 may receive an annular packing ring 11. The annular outer wall of the valve seat 10 is provided with a threaded intake hole 103 for water intake, a threaded outlet hole 104 for output of filtered water, a threaded discharge hole 105 for discharge of dirty water, and two opposite, symmetrical threaded water holes 106, 107 for output or intake of water, in which the intake hole 103, outlet hole 104, the discharge hole 105, and water hole 106 are all engageable with respective packing nuts 40 for connection with pipelines. With reference to FIGS. 3 and 4, each packing nut 40 is internally provided with an annular flange 401 for receiving a seal ring 41. A packing ring 42 is disposed between the annular flange 401 of the packing nut 40 and the seal ring 41 upon coupling of the packing nut 40 to the corresponding hole of the valve seat 10.

There is also provided a threaded pipe 50 for coupling to the water hole 107 of the valve seat 10. The threaded pipe 50 is internally provided with an annular flange 501 for receiving a seal ring 41 as well. And a packing ring 42 is sandwiched between the annular flange 501 and the seal ring 41 so as to achieve perfect sealing effects when connecting water pipes.

The split valve 20 is substantially an annular hollow casing having an interior divided into two isolated and non-communicating chambers A and B. The outer annular wall of the split valve 20 is provided with spaced water ports C for transfer of water. The split valve 20 further has a cylindrical rod 201 projecting from the center of an end surface thereof. The body of the rod 201 is provided with two annular grooves 202 for receiving two seal rings 21 and a threaded hole for coupling with a control rod 70. The rod 201 is further fitted with a packing ring 22.

The control rod 70 has a threaded portion 701 at either of its two ends, one of which is to engage the threaded hole 203 of the rod 201 of the split valve 20, the other is to screwably secure a ball 71 thereon.

The annular flange 101 at the bottom side of the valve seat 20 further has a packing ring 12 at an opening thereof for tight assembly with the bottom side of the split valve 20.

The valve cover 30 has a central opening 301 with a peripheral raised portion at one end surface thereof, resembling a nut. The other end surface is fitted with a seal ring 31.

When the split valve 20 is mounted in the valve seat 10, the rod 201 of the split valve 20 passes through the central opening 301 of the valve cover 30.

The valve cover 30 may be tightly coupled to valve seat 10 by turning the valve cover 30 with a tool. As the valve cover 30 is fitted with the seal ring 31, possible water leakage is avoided. Besides, the seal rings 21 and the packing ring 22 on the rod 201 of the split valve 20 further ensure water tightness between the valve cover 30 and the split valve 20.

Referring to FIG. 4, like the two water holes 106 and 107 which are arranged opposite to each other, the intake hole 103 of the valve seat 10 is aligned with the outlet hole 104 on the opposite side as well. In other words, the intake hole 103, the outlet hole 104, and the two water holes 106, 107 are spaced apart from each other at an angle of 90 degrees. As for the discharge hole 105, it is located halfway between the outlet hole 104 and the water hole 107, i.e., at an angle of 45 degrees from either hole.

Referring to the embodiment in FIG. 4, there are seven water ports on the body of the split valve 20, i.e., C1, C2, C3, C4, C5, C6, and C7, wherein port C1 is aligned with intake hole 103; port C3 aligns with water hole 106; port C5 aligns with outlet hole 104; port C6 aligns with water hole 107; port C2 is located between ports C1 and C3 at an angle of 45 degrees from each; port C4 is located between ports C3 and C5 at an angle of 45 degrees from each; and port C7 is located between ports C1 and C6 at an angle of 45 degrees from each.

Due to the relative positions of the above-mentioned holes and ports, when the split valve 20 is installed in the valve seat 10, a curved groove 204 at the bottom side of the split valve 20 may just engage the pin 102 on the bottom side of the valve seat 10 (see FIG. 3) so that the water ports C of the split valve 20 may align with the corresponding holes of the valve seat 10.

Figure 5:
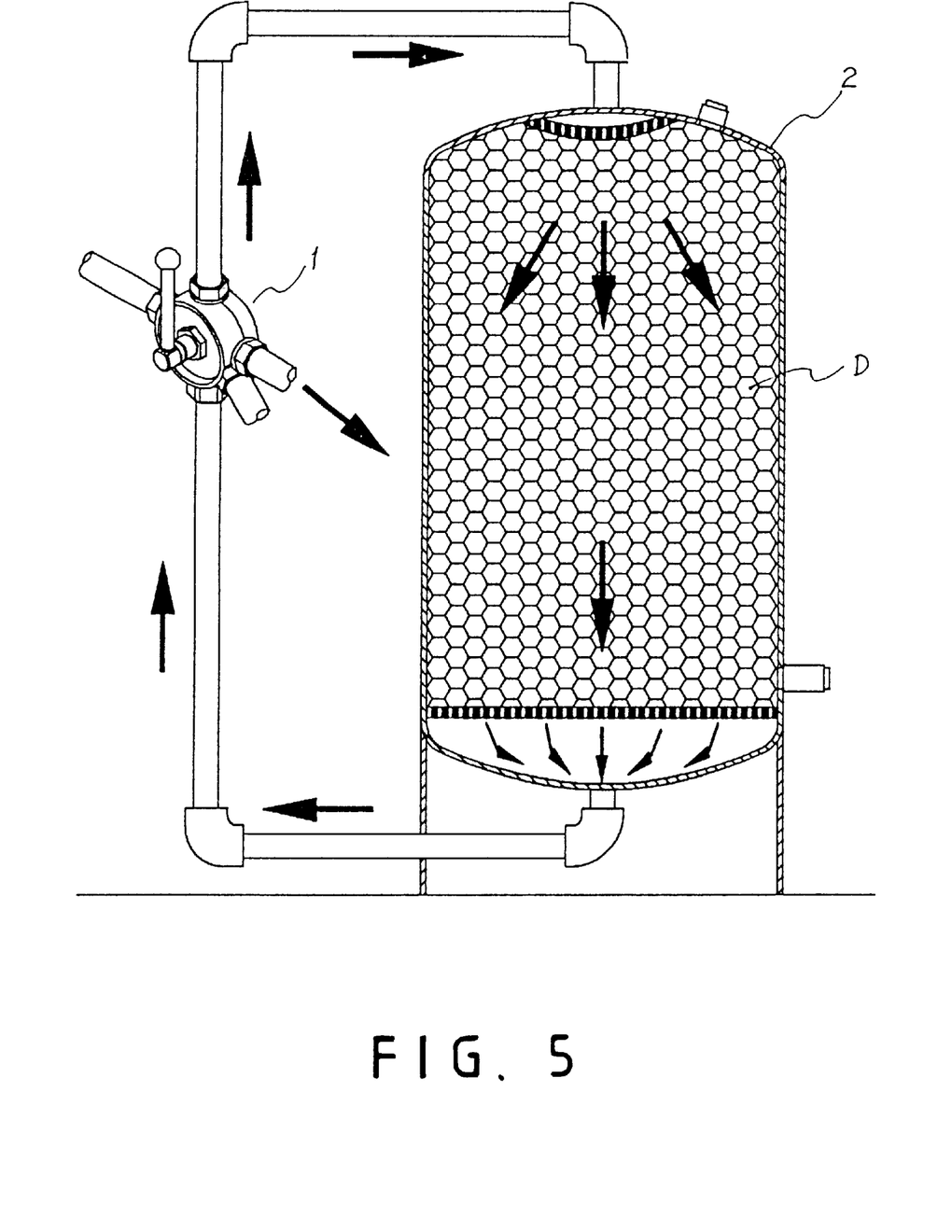
FIG. 5 is a schematic view of the water filtering system according to the present invention.

When water flows via the intake hole 103 past water port C1 into the chamber A of the split valve 20, the water ports C2 and C7 are closed, so that water flows out from the water port C3 through the pipe externally connected to the water hole 106 into the water container 20 from its top (see FIG. 5). The water container 2 is filled with layers of filter materials D. When water passes through these layers of filter materials D, impurities carried in the water are filtered off. The purified water then flows out from the bottom side of the water container 2 and is carried via a pipe to the other water hole 107 and guided via the water port C6 into the chamber B of the split valve 20 (see FIG. 4). At this point, the water port C4 is closed, so that the purified water may flow smoothly from the water port C5 through a transfer pipe connected externally to the outlet hole 104 to a drinking water outlet. During the process of water filtration and transfer, the discharge port 105 for discharge dirty water is closed as a result of the mounting position of the split valve 20. Hence, it can be ensured that the purified water will not flow out from the discharge hole 105.

Figure 6:
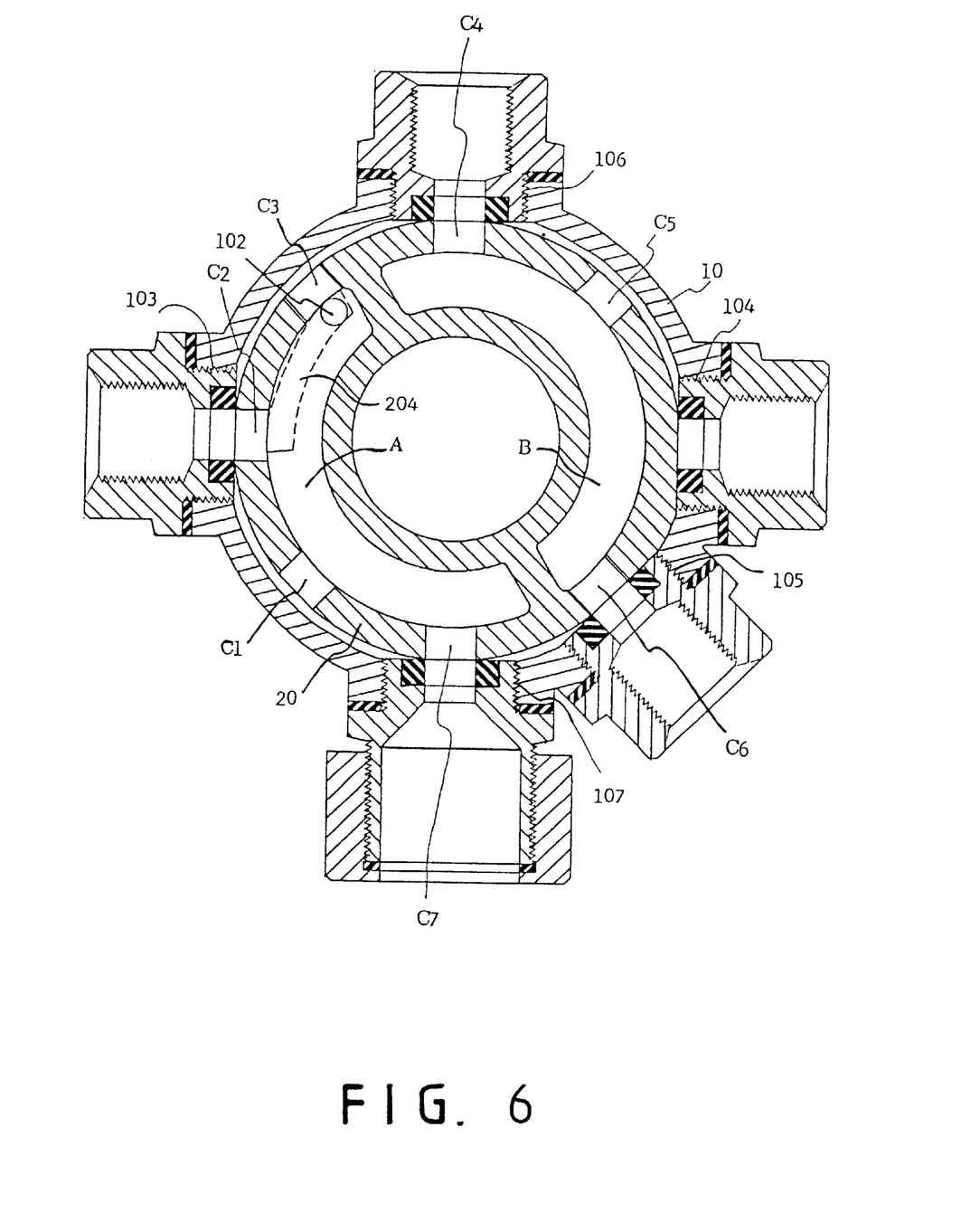
FIG. 6 is a sectional assembled view of the switch valve device of the present invention, illustrating its operation.
Figure 7:
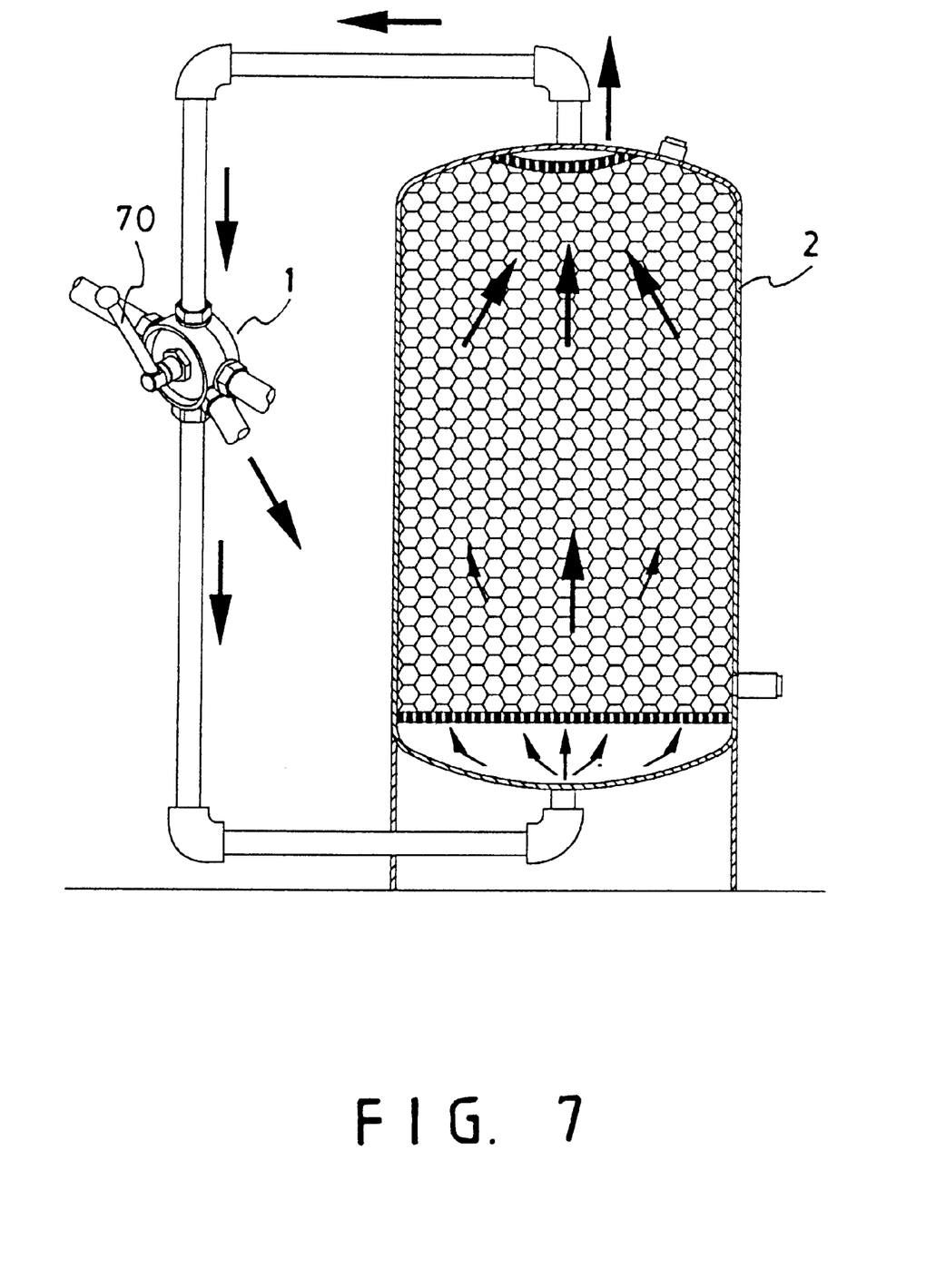
FIG. 7 is a schematic view illustrating the use of reverse flow of water to purge the water container of the present invention.

As shown in FIGS. 6 and 7, when the split valve 20 is controlled by the control rod 70 to displace, the pin 102 at the bottom side of the valve seat 10 will cause the curved groove 202 of the split valve to turn about a limited angle in a fixed direction. Besides, after turning of the split valve 20, some of the water ports C are still in alignment with their corresponding holes in the valve seat 10, ensuring the proper positioning of the split valve 20. After the split valve 20 has been turned, the water flows from the intake hole 103 via the water port C2 into the chamber A. At this point, the water ports C1 and C3 are both closed, so that water can only flow reversely from the water port C7 via the water hole 107 into the water container 2 from its bottom side. The reverse flow of water washes away particles and dirt deposited at the bottom side of the water container 20, and the particles and dirt are carried away by water via the transfer pipe into the switch valve device 1 past the water hole 106 and the water port C4 into the chamber B (see FIG. 6). At this point, the water port C5 is closed and the outlet hole 104 for outputting purified water has also been closed and isolated. Therefore, the dirty water in the chamber B will flow out through the water port C6 and be discharged via the pipe connected externally to the discharge hole 105.

In the present invention, water enters from the top of the water container 2 and is filtered. The purified water is controlled by the switch valve 1 to be discharged for drinking purposes. By turning the control rod 70 to a determined position, the flow of water is changed so that it enters from the bottom of the water container 2 to wash away deposits on the bottom side of the water container 2. The dirty water is then discharged by manipulating the switch valve device 1. The user does not have to worry about the correctness of the switching position. In summary, the entire construction is simple and easy to operate. Water tightness is ensured. The direction of water flow can be switched to provided filtering or purging effects. Besides, the switching is easy.

Figures 8, 8A, 8B:
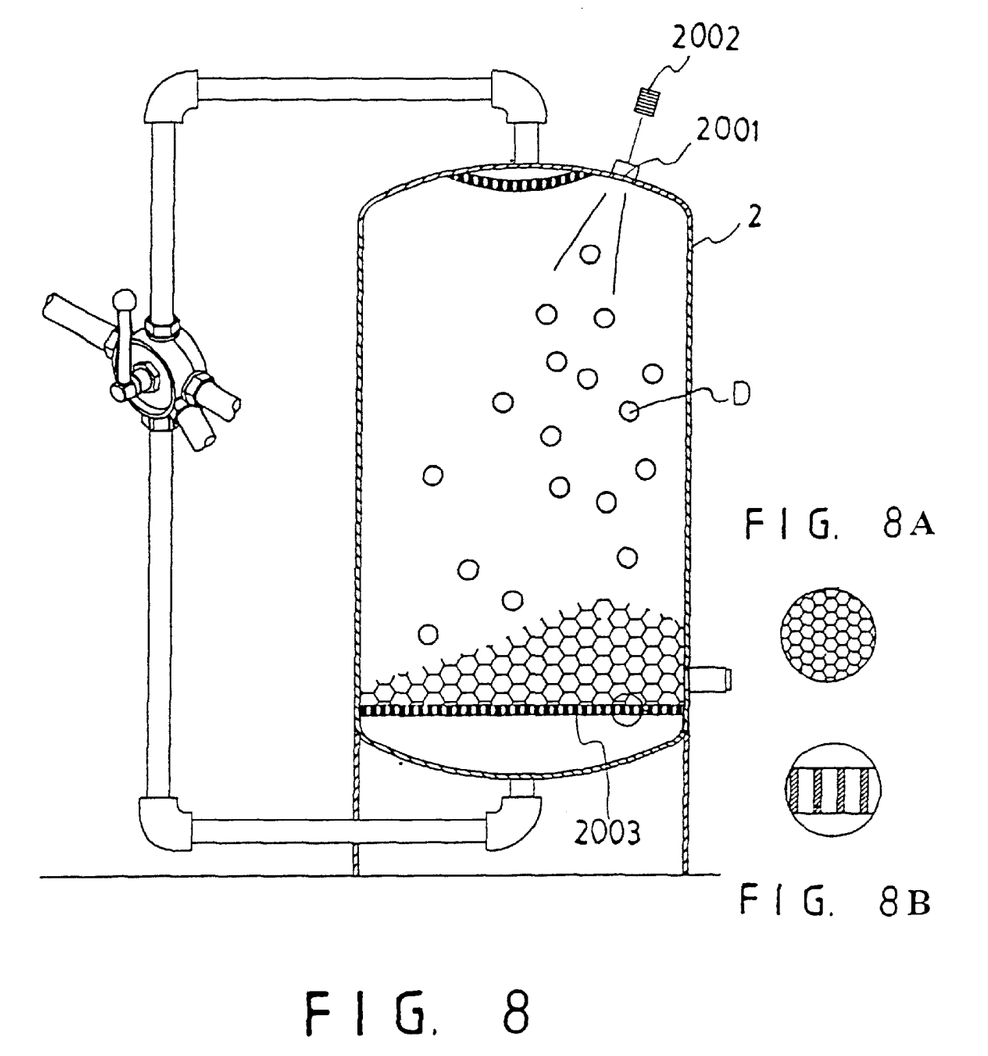
FIG. 8 is a schematic view illustrating the filling of filtering materials into the water container.

Referring to FIG. 8, the top side of the water container 2 is provided with an stopper hole 2001 for receiving a stopper 2002. The stopper 2002 can be removed to allow filling of filtering materials D into the water container 2. Within the water container 2 at the bottom side of the water container 2, there is provided a bottom screening layer 2003 with meshes of a size smaller than the particle size of the filtering materials D so that the filtering materials D will not be carried away by the purified water.

Figure 9:
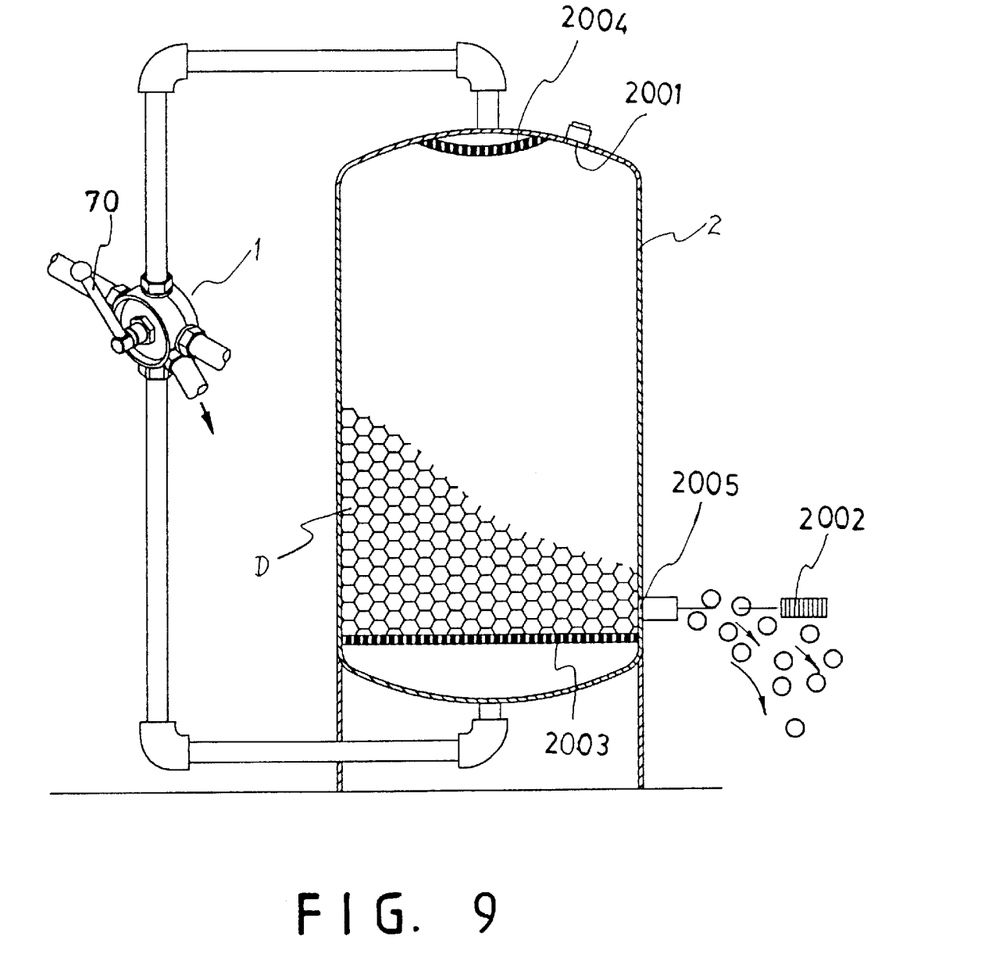
FIG. 9 is a schematic view illustrating the discharge of filtering materials from the water container.

Referring to FIG. 9, a top screening layer 2004 of the same mesh size is also provided at the inner top side of the water container 2 such that it will not obstructing the filling of filtering materials D into the water container 2 from the upper stopper hole 2001. A lower stopper hole 2005 is also provided near the bottom screening layer 2003 for receiving a stopper 2002. During replacement of the filtering materials D, the stopper 2002 is removed from the lower stopper hole 2005 and the control rod 70 is manipulated to cause the water to flow reversely from the bottom of the water container 2 into the water container 2 to wash its interior. The top screening layer 2004 will block the passage of dirty water, and the dirty water will only be allowed to flow out via the discharge hole of the switch valve device 1, while the old filtering materials D are discharged from the lower stopper hole 2005 at the bottom of the water container 2. It can therefore be appreciated that the replacement of filtering materials is very convenient, without the need to dismantle the filtering apparatus or other connecting pipes.

I claim:

1. A water filtering apparatus with water flow switching valve device comprising a water container filled with filtering materials and a switch valve device connected between two ends of the water container, wherein said switch valve device comprises:

a valve seat which in a substantially hollow casing and includes a seat body and a base, said base being provided with an annular flange and a pin, said seat body being provided with a threaded intake hole for intake of water, a threaded outlet hole for outputting purified water, a threaded discharge hole for discharge of dirty water, and two water holes for transfer of water, said intake hole being arranged opposite to said outlet hole and in alignment therewith, and said water holes being oppositely arranged and in alignment with each other, such that said intake hole, said outlet hole and said two water holes are spaced apart from each other at an angle of 90 degrees, said discharge hole being located between said outlet hole and one of said water holes at an angle of 45 degrees from each;

a split valve which is a substantially hollow casing defining two isolated and non-communicating chambers therein, said split valve being provided with a curved groove at a bottom side thereof and spaced water ports in an outer peripheral wall thereof, said split valve further having a cylindrical rod projecting from the center of an end surface thereof, said rod being provided with two annular grooves and a threaded hole;

a control rod which is received in said threaded hole of said rod of said split valve; and a valve cover which may be tightly secured to said valve seat and is provided with a central opening having a raised rim resembling a nut, said central opening receiving said rod of said split valve, whereby said split valve may be manipulated to change the direction of water flow so that the water may be controlled to enter said water container for filtering purposes or to flow reversely into said water container for purging purposes.

2. The water filtering apparatus with water flow switch valve device as claimed in claim 1, wherein said split valve is mounted in said valve seat such that said curved groove at the bottom of said split valve will just engage said pin at said base of said valve seat so that said split valve can only turn about a limited angle in a fixed direction.

3. The water filtering apparatus with water flow switch valve device as claimed in claim 1, wherein each of said threaded holes of said valve seat receives a packing nut having an inner annular flange, a seal ring fitted on said inner annular flange of said packing nut, and a packing ring disposed between said annular flange of said packing nut and said seal ring, thereby ensuring water tightness.

4. The water filtering apparatus with water flow switch valve device as claimed in claim 1, wherein said outer peripheral wall of said split valve is provided with seven water ports in which two of said water ports are respectively aligned with said intake hole and one of said water holes; the other two water ports are respectively located between said two water holes at a bisecting angle of 45 degrees and are distributed at one of said two chambers; two further water ports are respectively aligned with said outlet hole and the other of said water holes; and the last of said water ports is located above said outlet hole at an elevated angle of 45 degrees, these three water ports being distributed at another one of said two chambers.

5. The water filtering apparatus with water flow switch valve device as claimed in claim 1, wherein said water container is respectively provided with an upper screening layer and a lower screening layer at its top and bottom sides, said screening layers having fine meshes adapted to block passage of filtering materials, said top and bottom sides of said-water container being further provided with an upper stopper hole and a lower stopper hole for receiving respective stoppers, whereby new filtering materials may be filled via said upper stopper hole and old filtering materials may be discharged via said lower stopper hole, thus eliminating the need to dismantle said water container or water pipes when replacing filtering materials.

\* \* \* \* \*